May 31, 1932.  W. H. GIBB  1,861,005
ELECTRIC WELDING APPARATUS
Filed Aug. 7, 1930
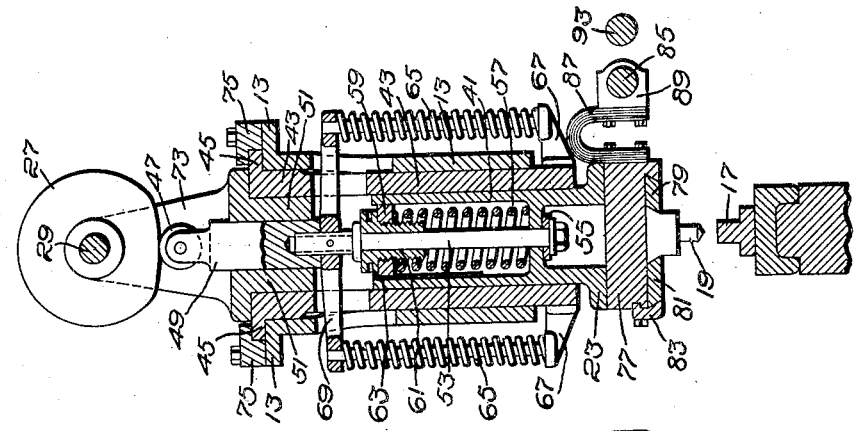
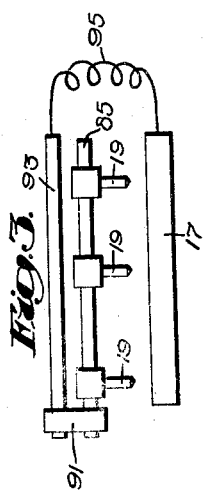
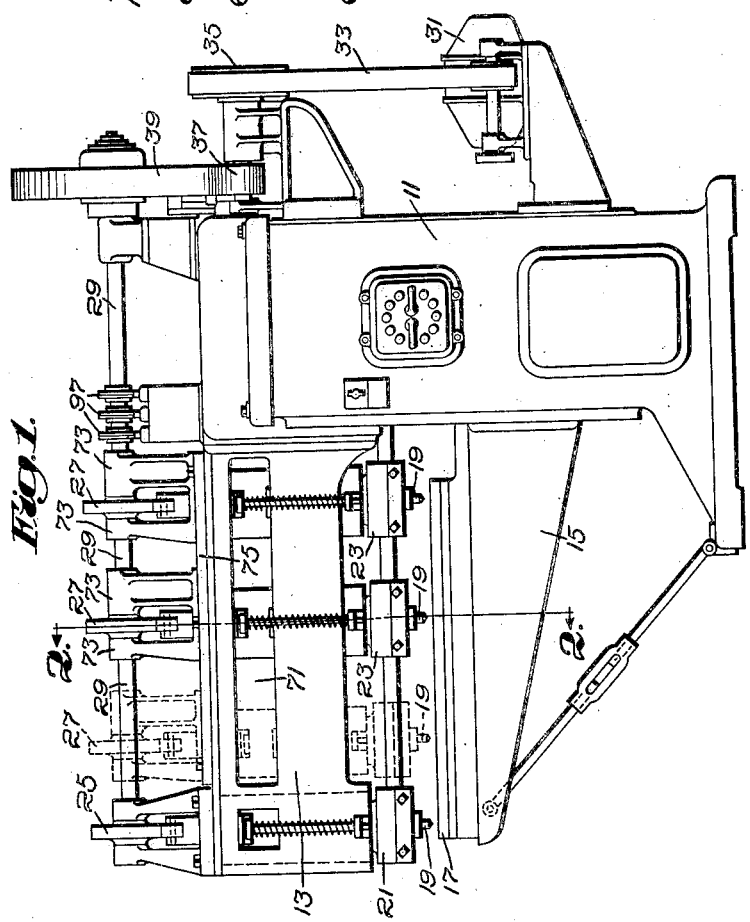
Inventor:
William H. Gibb
by Emery, Booth, Varney & Townsend
Attys Patented May 31, 1932

1,861,005

UNITED STATES PATENT OFFICE

WILLIAM H. GIBB, OF BAY CITY, MICHIGAN, ASSIGNOR TO THOMSON-GIBB ELECTRIC WELDING COMPANY, OF LYNN, MASSACHUSETTS, A CORPORATION OF MASSACHUSETTS

ELECTRIC WELDING APPARATUS

Application filed August 7, 1930. Serial No. 473,528.

This invention relates to electric welding apparatus and more particularly to multiple spot welding machines where a given cycle of operation of the machine is adapted to effect spot welding at a plurality of separated spots in the work. One object of the invention is to provide a machine wherein a very simple but quick adjustment may be made to conform to a change of work requiring a different distance between centers of the welded areas.

The invention will be best understood by reference to the following description when taken in connection with the accompanying illustration of one specific embodiment thereof, while its scope will be more particularly pointed out in the appended claims.

In the drawings:

Fig. 1 is a side elevation of a machine embodying one form of the invention;

Fig. 2 is a vertical cross-section in elevation taken on the line 2—2 through one of the adjustable welding heads; and Fig. 3 is a diagrammatic representation showing the circuit connections of the electrodes.

Referring to the drawings and to the embodiment of the invention which is there shown for illustrative purposes, the machine comprises a main frame in the form of an upright housing or standard 11 from which there extends laterally an upper, elongated, rigid, supporting arm 13 adapted to overhang a substantially parallel lower head or arm 15, which is also mounted on said standard but may be adjusted vertically thereon. The transformer for supplying heating current is mounted within the upright structure 11 and is not here shown, but may be of any well known type.

The lower arm serves as a support for the fixed electrode contact on which the work rests in the gap between the fixed and movable electrodes. The fixed electrode contact is in the form of a continuous bar or plate 17 of conductive metal connected to one terminal of the transformer secondary.

Mounted in the upper arm 13 and at separated intervals lengthwise the same there are provided a plurality of movable electrodes 19 connected to the other terminal of the transformer secondary and each adapted to have imparted to it a vertical reciprocatory movement to cause it to contact with and withdraw from the work at each cycle of operation of the machine. The electrodes 19 are herein shown as having pointed contact ends, but electrodes having flattened contact faces may be employed. Each electrode 19 is carried by a reciprocating head, the head 21 near the end of the arm being arranged to operate at a fixed position thereon, the two heads 23 being arranged, as more fully described, so that they may be adjustable at will lengthwise the arm to vary the distance between the centers of welding points.

While for illustrative purposes I have shown the machine equipped with one fixed and two adjustable welding heads, any number of heads may be employed, the arms 13 and 15 being lengthened or shortened as may be necessary to conform to the number of heads provided. Any number of the heads which are employed,—either one or more,— may be made adjustable.

For each welding head there is provided an actuator for reciprocatively moving its electrode and determining the timing of the movement thereof, the actuator for the fixed head 21 being in the form of a power-driven cam 25 and that for the adjustable heads 23 in the form of similar cams 27, the several cams of the series being operatively related to and herein mounted upon the driving shaft 29 which extends lengthwise the arm 13 above the same.

Any suitable source of power may be employed for operating the cam driving shaft 29, such as the electric motor 31 which is connected to the shaft to drive the same through the belt 33, pulley 35, driving pinion 37 and driving gear 39.

Each adjustable welding head 23 is associated with its actuating cam and suitable supporting and guiding means such that the head, cam and support as a unitary structure may be readily adjusted lengthwise the arm and the driving shaft.

For this purpose (see Fig. 2) the head 23 is connected to a barrel-shaped, piston-like plunger 41 which is guided vertically in a cylindrical support 43, the latter being vertically fixed but longitudinally adjustable on the arm 13 through the provision of the flanges 45 which overlie and rest upon guideways in the form of the upper flattened flanged faces of the arm.

To depress the electrode 19, the cam 27 has engagement with a cam follower in the form of a roller 47 carried by the plunger rod 49 which is slidable in the flanged bushing 51 fixed in the cylindrical support 43. The rod 49 is secured at its lower end to the upper end of a depending pin 53 which extends down and has sliding movement through the bottom of the plunger barrel 41, its protruding end being provided with a washer 55 which causes the plunger to lift with the lifting of the pin.

In depressing the electrode, the pin acts through a spring 57, the bottom of which seats against the bottom of the plunger barrel and the top of which abuts against a washer 59 which is secured to the pin. When the pin is depressed through the action of the cam, the electrode is depressed until contact is had with the work, when further depression of the pin moves the latter through the bottom of the plunger, compressing the spring and merely increasing the pressure under which the electrode is applied against the work surface.

The abutting washer 59 is threaded on the sleeve 61, the latter being provided with a head 63 abutting against a collar on the pin. The washer is non-rotatably mounted in the plunger barrel through a groove and key connection and may be adjusted lengthwise the pin by turning the head 61, thereby adjusting the compression on the spring.

The cam follower is maintained pressed against the cam, and the head is caused to retract from the work when the cam permits, by the two lifting springs 65 which are located at opposite sides of the arm 13. The bottom of each spring seats against a vertically fixed lug 67 extending laterally from the lower end of the cylindrical support 43, the top of each spring abutting against an under side of the end of a lifting cross bar 69, the mid portion of which is secured to the rod 53. The cross bar projects through suitable apertures in the support 43 and through an elongated slot 71 in the arm 13, which slot permits the entire unitary structure to be moved lengthwise the arm as required.

The cam 27 is non-rotatably mounted on the drive shaft 29 but is slidable lengthwise the same by any suitable connection, such as a tongue and slot, and is held between the camshaft journal bearings 73 which are mounted on and carried by the flanged bushing 51.

The electrode head structure is held clamped in any selected position of adjustment lengthwise the arm by means of the two clamping plates 75 which are bolted to the flanged extensions of the arm 13 and overlie the flanged sides of the guiding support 43.

Accordingly, when it is desired to change the position between the centers of welding points, this entire unitary structure, comprising the electrode-carrying head, guiding support, the actuating cam, the drive shaft bearings and the associated parts, may be shifted to any position lengthwise the arm, as from the full line position shown in Fig. 1 to the dotted line position therein shown, by merely loosening the clamping plate and sliding the structure along the arm until the desired position of the adjustment is had, when it may be again clamped in fixed position on the arm.

The electrode 19 is carried by a block 77 of copper or other conductive metal, being secured thereto by the wedge-shaped spacer plates 79 and 81 which engage the sides of the tapered head of the electrode and are held in clamped position by the clamping plate 83, this connection also permitting a limited close adjustment of the electrode in the head lengthwise the arm.

The block 77 is electrically connected to a conductor bar 85 by means of flexible conducting strips 87 which permit the necessary vertical reciprocatory movements of the movable electrode 19, connection being made to the bar by means of a clamp 89 also of conductive material. When the head is moved to a new position of adjustment on the arm, the clamp 89 is loosened and shifted to a correspondingly new position on the bar 85.

The bar 85 (Fig. 3) extends lengthwise the machine and is connected by means of the conductive connection 91 at its outer end, or that remote from the standard 11, to a second conductor bar 93 extending in the opposite direction substantially parallel to the bar 85, the opposite end of the bar 93 being connected to one terminal of the transformer secondary 95. The remaining terminal of the transformer secondary is connected to the lower electrode plate 17 at the end nearest to the standard 11, or at the end which is relatively remote from that end of the bar 85 which has connection to the transformer secondary. This arrangement provides conductive paths for the welding current through the several welding electrodes which are always of equal resistance, irrespective of the position to which the electrodes may be adjusted lengthwise the arm, and maintains under all conditions of adjustment a uniform path of current for each head.

The supporting and guiding means and the actuating device for the head 21 which operates at a fixed position lengthwise the supporting arm may be of any desired construction and may, for example, be substantially similar to the construction shown in Fig. 2, except that the supporting and guiding member 43 is non-adjustably secured to the supporting arm or, if desired, may be formed in that arm itself.

Any usual or suitable devices may be employed for controlling the timing of the current supply to the several electrodes, such, for example, as the individually adjustable cam operated switches 97 actuated by the cam shaft 29, one switch being provided for each separate point of welding contact.

The machine is operated in the usual manner with multiple spot welding machines and upon the varieties of work to which such machine are applicable. When, due to change in the character of work to be welded, it is required to alter the distance between the center of the welded areas, the clamping plates 75 are loosened and the adjustable heads, each with its actuating cam, are shifted lengthwise the arm to provide the required change in relative position after which the clamping plates are again tightly set. If a closer adjustment of any of the electrodes is required it may be had by the adjustment of the electrode 19 in its block 77.

While I have herein shown and described for the purpose of illustration one specific embodiment of the invention, it is to be understood that extensive deviations may be made in respect to the number of stationary and adjustable welding units employed, the specific construction of each unit and in the form and relative arrangement of parts, all without departing from the spirit of the invention.

Claims:

1. A multiple spot welding machine having an elongated supporting arm, a plurality of welding units mounted thereon each having a reciprocatory electrode, a cam shaft extending lengthwise said arm, an actuating cam for each electrode, at least one of said welding units comprising in a unitary structure adjustable lengthwise the arm its electrode, a reciprocatory, cam-actuated, electrode-carrying head and supporting and guiding means therefor together with means for maintaining the operative relation of the cam to the head on adjustment of the structure, and means for securing said unit in its adjusted position on the arm.

2. A multiple spot welding machine having a supporting arm, a cam shaft, and a plurality of welding units mounted on said arm, each having a reciprocating electrode-carrier with a cam operatively related to said shaft for imparting movement to the carrier, at least one of said units together with its cam being adjustable on said arm lengthwise said shaft to vary the distance between centers of welded areas.

3. A multiple spot welding machine having an elongated supporting arm, a plurality of welding units carried by said arm, a cam shaft extending lengthwise the arm, one of said units being adjustable lengthwise the arm to vary the distance between centers of welded areas, and an actuating cam for said unit on said shaft also adjustable lengthwise the same.

4. A multiple spot welding machine provided with a plurality of welding units having each a movable electrode, at least one of said units including in a self-contained structure an electrode carrier and means operable to move the electrode to welding position, said unit being adjustable on said machine to vary the distance between centers of welded areas.

5. A multiple spot welding machine having a welding unit, including a self-contained structure an electrode carrier and means operable to reciprocate said carrier and determine the timing thereof, said unit with said means being adjustable on said machine as a single structure to vary the distance between centers of welded areas.

6. A multiple spot welding machine having a plurality of electrodes movable toward and away from the work, and an actuating means operable for moving each of said electrodes and determining the timing of the movement thereof, at least one of said electrodes with its actuating means being adjustable as a unit on said machine to vary the distance between centers of welded areas.

7. A multiple spot welding machine having a plurality of electrodes movable toward and away from the work with means for sequentially actuating the same, at least one of said electrodes being carried by single structure means movable toward and away from another of said electrodes for varying the distance between centers of welded areas while maintaining the sequential actuation of the electrodes, and means for retaining said movable structure in adjusted position.

8. In a multiple spot welder, the combination with welding heads relatively adjustable to vary the distance between the centers of welded areas, of an electrode adjustable in one of said heads to further vary the relative positions of the welded areas.

9. A multiple spot welding machine comprising stationary electrode means and a plurality of movable electrodes for cooperation therewith, combined with means for sequentially advancing the latter to operative position in relatively timed relation; at least one of said movable electrodes being carried by a unitary structure comprising an electrode-carrying head with supporting and guiding means therefor, said unitary structure being movable in said machine to cooperate with different portions of said stationary electrode means while maintaining the timed relation of actuation of its electrode by said electrode advancing means.

In testimony whereof, I have signed my name to this specification.

WILLIAM H. GIBB.